United States Patent
Alfredo

Patent Number: 6,038,951
Date of Patent: Mar. 21, 2000

[54] HIGH SPEED FLYING SHEARS

[75] Inventor: Poloni Alfredo, Redipuglia, Italy

[73] Assignee: Danieli & C. Officine Meccaniche SpA, Udine, Italy

[21] Appl. No.: 08/217,657

[22] Filed: Mar. 25, 1994

[30] Foreign Application Priority Data

Apr. 2, 1993 [IT] Italy ................... UD93A0055

[51] Int. Cl.$^7$ ................................. B23D 25/08
[52] U.S. Cl. ................ 83/105; 83/112; 83/165; 83/306; 83/444
[58] Field of Search ............... 83/105, 106, 107, 83/102, 159, 162; 140/2

[56] References Cited

U.S. PATENT DOCUMENTS

| | | |
|---|---|---|
| 3,834,260 | 9/1974 | Sieurin et al. ............... 83/106 |
| 5,040,440 | 8/1991 | Harvey ....................... 83/106 |

*Primary Examiner*—M. Rachuba
*Attorney, Agent, or Firm*—Antonelli, Terry, Stout & Kraus, LLP

[57] ABSTRACT

High speed flying shears with contrarotating blades (13) fitted to blade-holder drums (30), the shears comprising an upstream one-channel switch (16) of a start-stop type which conveys the rolled stock (11) lengthwise into sharing area and can be oriented laterally on a plane substantially containing the axis of feed of the rolled stock (11) and parallel to and lying between the planes containing shafts (12) of rotation of the blade-holder drums (30), the circumferential position of the blades (13) being associated with the lateral position of the upstream one-channel switch (16) at least in the transient time of the feed of the rolled stock (11) through the shearing area (35), a two-channel (22–23) switch (20) which can be oriented laterally substantially on the same orientation plane as, and in synchronization with, the one-channel switch (16), the two-channel switch (20) including the inlets of two enlarged channels (22–23) superimposed on each other on a plane perpendicular to the axis (12) of rotation of the blade-holder drums (30), a central partition plate the blades (13) being two on each drum (30) and arranged on one drum (30) as a counterpart to the blades (13) on the other drum (30) so as to form a specific pair of blades (13a) to shear the leading end (11a) of the rolled stock (11) and to create in the rolled stock (11) a first terminal arcuate portion, and a specific pair of blades (13b) to shear the trailing end (11b) of the rolled stock (11) and create in the trailing segment of the rolled stock a second contrary leading arcuate portion.

8 Claims, 4 Drawing Sheets

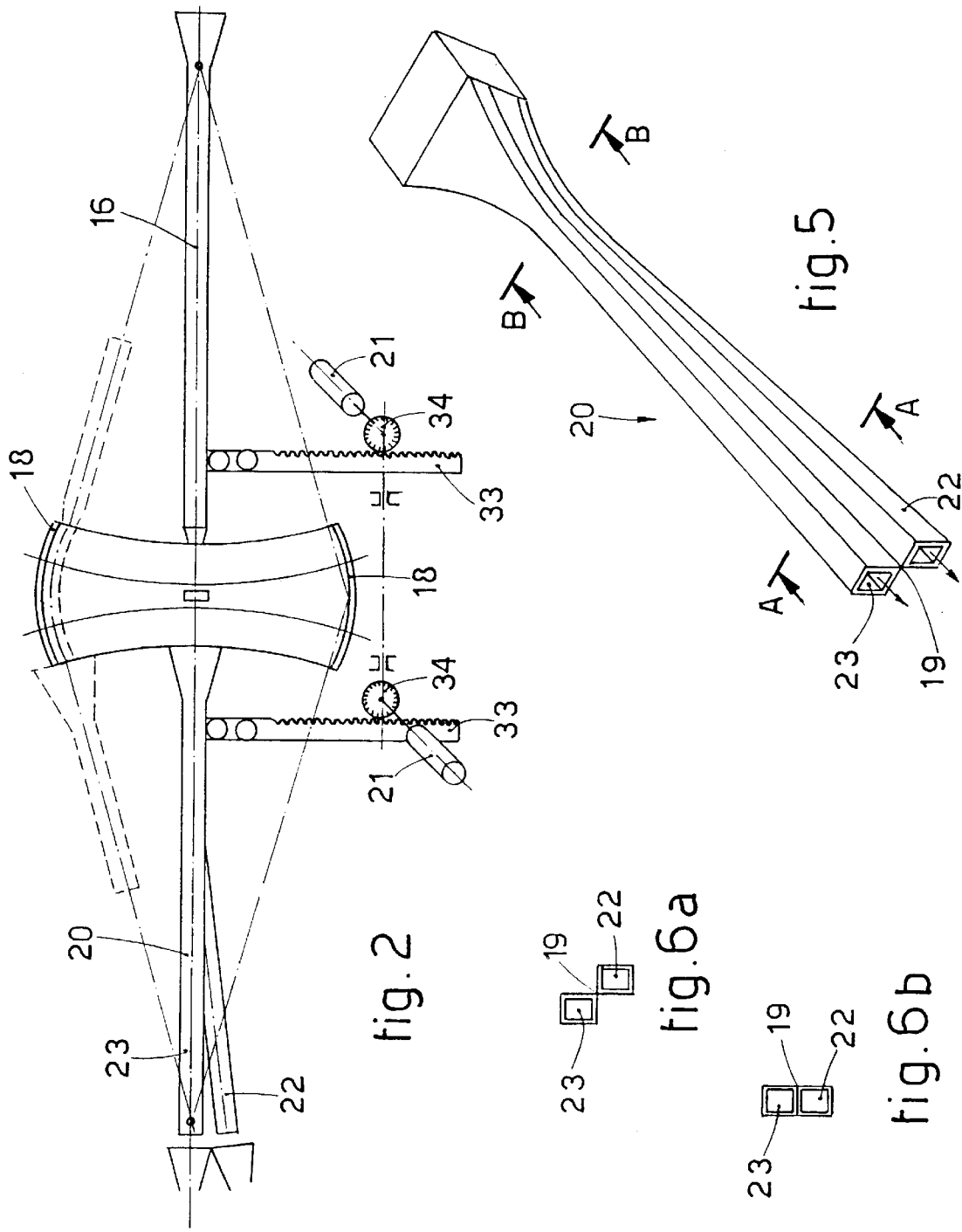

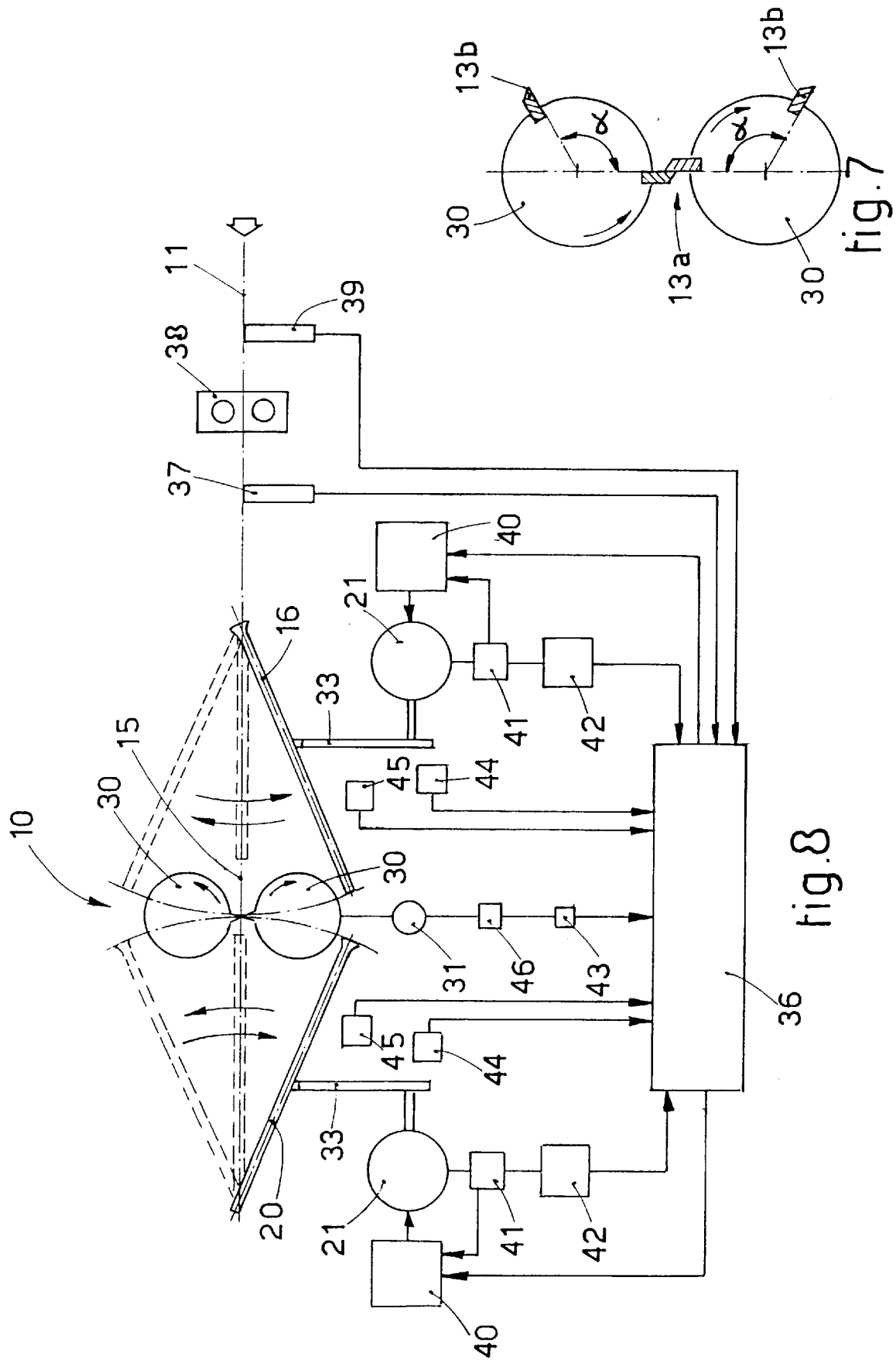

HIGH SPEED FLYING SHEARS

BACKGROUND OF THE INVENTION

This invention concerns a high speed flying shears.

The flying shears according to the invention acts on the rolled stock, whether the latter be a round rod, wire rod, bar, etc., leaving the last rolling train.

The flying shears according to the invention is suitable to shear rolled stock travelling at up to 100–120 meters per second or more.

It is a known fact of the state of the art that the leading and trailing ends of the rolled stock leaving the last rolling train include along their length geometric deformations or inclusions which are not acceptable and therefore have to be eliminated. This is normally carried out at speed so as to obviate the times otherwise required for shearing by hand downstream.

In view of the very high speed of withdrawal of the rolled stock from the rolling trains the problem of arranging in line a flying shears providing sufficient assurance of precision, reliability and accuracy of shearing becomes ever more important.

Various disclosures of flying shears for use with rolled stock travelling at a high speed are known and employed in the state of the art.

Substantially efficient solutions are disclosed in FR-666.433, DE-804.056, GB-2,075,899 and FR-1.578.587 but have been found unsatisfactory for rolled stock travelling at very high speeds. In particular, these solutions cannot meet the shearing accuracy required.

IT-A-1.214.194 in the name of the present applicants discloses a very high speed flying shears which includes contrarotating blades and cooperates with a switch of a start-stop type. This switch is suitable to convey the rolled stock longitudinally and to move sideways so as to feed the rolled stock into the shearing area.

The circumferential positions of the contrarotating blades can be linked to the lateral position of the switch with a view to determining exactly the moment when the rolled stock will lie between the blades, this moment coinciding with the best position of those blades for the shearing operation.

This solution is satisfactory in itself but entails the drawback that the rolled stock leaving the shearing step is not correctly guided towards the stations downstream, and this situation involves vibrations and inaccuracies in directing the stock towards the respective channels. Moreover, the solution does not provide a natural deviation for the intake of the material downstream of the shears, whether the material be the main body of the rolled stock directed towards the winding machine or be the sheared ends directed towards the scrap shears.

Starting therefore from the teaching of IT-A-1.214.194, the present applicants have designed and achieved an improvement of the flying shears which overcomes the shortcomings of the state of the art and has the purpose of accomplishing further advantages.

This invention is set forth and characterised in the main.

SUMMARY OF THE INVENTION

According to the invention a one-channel switch of a known type is included upstream of the shears unit and conveys longtitudinally the rolled stock leaving the last rolling train. This one-channel switch is able to be displaced sideways on a plane parallel to and between the planes containing the axes of rotation of the blades; this plane of sideways displacement of the switch contains the shearing axis.

According to the invention a two-channel switch is included downstream of the shears and is equipped to guide the main body of the rolled stock with one channel and to guide the sheared ends of the stock with the other channel.

In the description that follows is meant by "main body of the rolled stock" the rolled stock separated from its leading and trailing ends.

The two-channel switch conveys and guides in each step the main body of the rolled stock towards the coil-forming headstock and the sheared ends towards the scrap shears.

The two-channel switch thus ensures that the product or products leaving the shearing step is or are always guided, and also ensures that vibrations of the main body of the rolled stock leaving the shears are eliminated.

Both the one-channel switch upstream and the two-channel switch downstream of the shears are actuated on their plane of orientation by respective synchronised displacement means, which may be independent of each other or be connected together mechanically or electrically.

The rolled stock, when it reaches a pre-set position upstream of the shears, actuates the sideways displacement of the switches, which by that displacement cause the rolled stock to be fed through the shearing area.

The speed of sideways displacement of the switches is correlated, at least in the transient shearing moment, with the circumferential position and speed of rotation of the blades so that the moment of passage of the rolled stock between the blades coincides with the required shearing position of the blades.

According to the invention there is a determined, momentarily unchanging and rigid link between the means which provide the circular motion of the blades and the means which condition the sideways displacement, in one direction or the other, of the switches which guide the rolled stock.

This determined link conditions momentarily the sideways displacement of the switches in relation to the angular position of the blades.

Each drum of the pair of blade-holder drums in the flying shears according to the invention is fitted with two blades, thus providing altogether two pairs of blades. To be more exact, a first pair of blades is employed to shear the leading end of the rolled stock, while a second pair is employed to shear the trailing end of the same.

In other words, for instance, during the shearing steps the first pair of blades bends the leading end of the main body of the rolled stock with a downwardly facing sheared lip and bends the tail-end of the sheared leading segment with an upwardly facing sheared lip.

Instead, the second pair of blades bends the trailing end of the main body of the rolled stock with a downwardly facing sheared lip and bends the front end of the sheared trailing segment with an upwardly facing sheared lip.

The two blades on each blade-holder drum are therefore positioned in relation to the deformation to be applied to the sheared lips so as to direct the sheared products into the correct guiding channels.

The blades are positioned as required along the circumference of one blade-holder drum and in counterpart positions on the other blade-holder drum.

The two blades are positioned on a drum advantageously at about 180° to each other.

With this arrangement the feed of the material into the respective channels of the two-channel switch after the leading and trailing ends have been sheared is as natural as possible and is achieved directly by the raising or lowering of the sheared lips accomplished by the action of the contrarotating blades.

By means of the flying shears according to the invention it is also possible to eliminate the upstream and downstream drawing means, thus ensuring a reduction in the cost, complexity, weight and overall bulk of the flying shears. This is possible precisely owing to the steering and guiding of the rolled stock throughout its whole passage through the shears according to the invention.

The upstream drawing means can be eliminated since the vibrations and oscillations of the rolled stock downstream of the blades are reduced considerably.

The downstream drawing means too can be eliminated by bringing the drawing means of the coil-forming headstock close to the shears and by making use of the drawing action of the latter drawing means on the rolled stock.

BRIEF DESCRIPTION OF THE DRAWINGS

The attached figures are given as a non-restrictive example and show a preferred embodiment of the invention as follows:

FIG. 2 is a diagram of a form of the lay-out of the shearing area of the flying shears according to the invention;

FIG. 5 shows a two-channel switch cooperating with the flying shears according to the invention;

FIGS. 6a and 6b show sections along the lines A—A and B—B respectively of the two-channel switch of FIG. 5:

FIG. 7 shows a possible embodiment of the blade-holder drums;

FIG. 8 is a working diagram of the shears according to the invention.

DETAILED DESCRIPTION OF THE PREFERRED EMBODIMENTS

Figure 1:
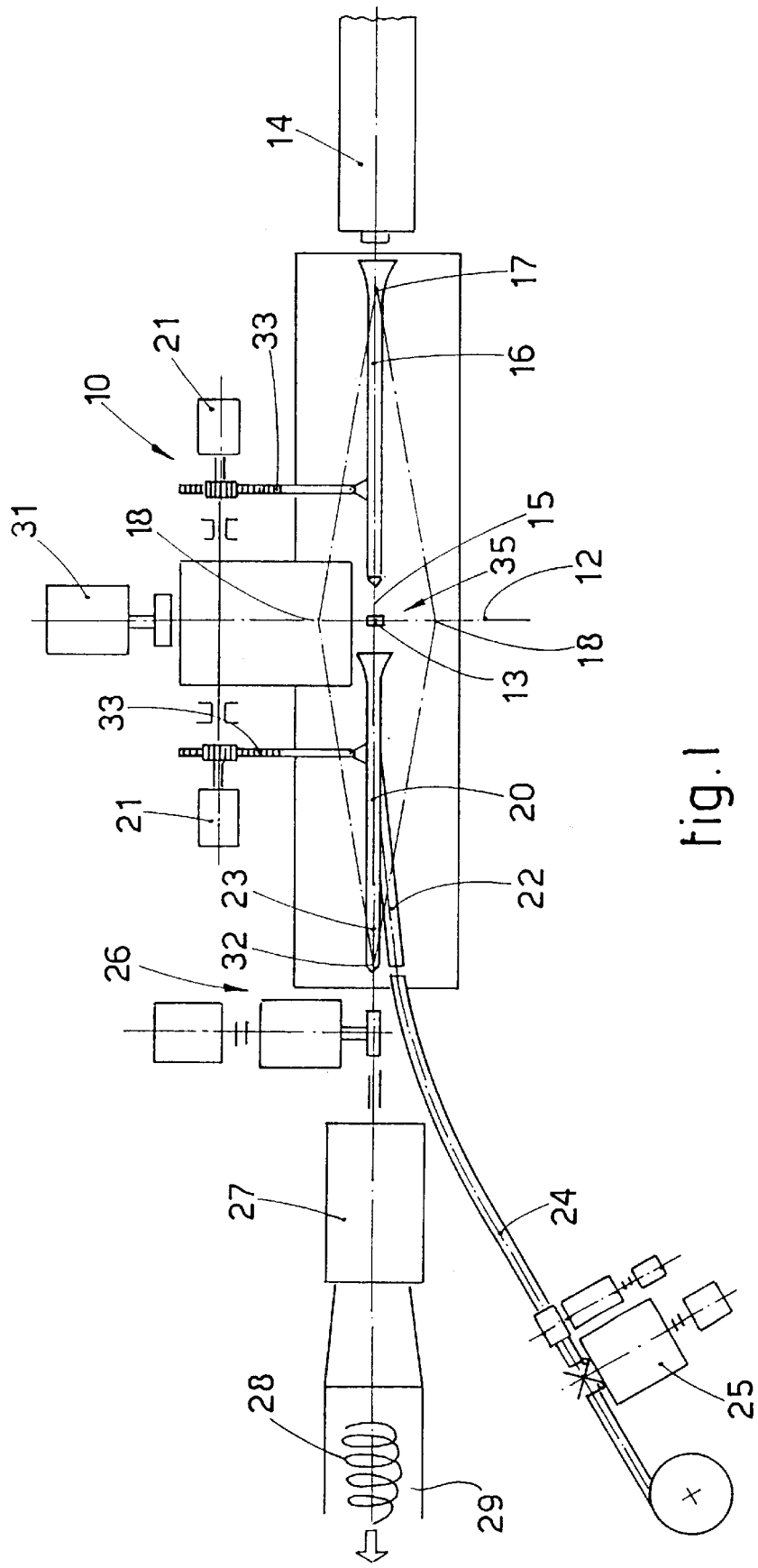
FIG. 1 is a plan view of a flying shears according to the invention.

In the figures a flying shears 10 has a structure substantially of the type of flying shears disclosed in IT-A-1.214.194.

In particular, the shears 10 comprises one D.C. motor 31 for each of the two shafts 12 supporting blades 13. The shearing axis 15 passes between the shafts 12 and the width of the blades 13.

Rolled stock 11 is fed along an arrival channel 14 and enters a one-channel switch 16, which can be oriented sideways on a rotation pivot 17 along a plane parallel to and between the planes containing the shafts 12 that support the blades 13.

Orientation of the one-channel switch 16 is determined between two end positions cooperating with stationary terminal stops 18. These end positions are advantageously arranged symmetrically in relation to the shearing axis 15.

A two-channel switch 20, which too can be oriented sideways on a pivot 32 substantially on the same plane of orientation as the one-channel switch 16, is included downstream of a shearing area 35.

The upstream one-channel switch 16 and the downstream two-channel switch 20 are both governed by respective synchronised drive motors 21, which, for instance, are independent or are connected electrically by an encoder or mechanically by a mechanical shaft.

According to a variant only one drive motor 21 is included and is positioned on one side for both the switches 16, 20.

The mechanisms which regulate the rotation of blade-holder drums 30 and the oscillation of the switches 16 and 20 are operated by a software actuation and control unit 36 which ensures synchronisation of the switches 16 and 20 and of the blade-holder drums 30 substantially at one single exact point and in one single exact condition.

During the shearing step the lateral positions of the switches 16 and 20 in relation to the shearing axis 15 are correlated with the circumferential positions of the blades 13, so that when the axes of the switches 16 and 20 coincide substantially with the shearing axis 15, the blades 13 too lie substantially on a vertical plane comprising the rotation shafts 12 and between those shafts 12.

In the example of FIG. 2 each of the drive motors 21 of the switches 16 and 20 actuates a pinion 34 associated with a rack 33; these racks 33 are solidly united to their relative switch 16 or 20, and the orientations of the switches 16 and 20 are correctly synchronised at every moment.

According to the invention the two channels of the two-channel switch 20 in this case are a channel for scrap 22 and a channel to discharge 23 the main body of the rolled stock 11.

To be more exact, the scrap channel 22 cooperates at its downstream end with an outlet conveyor 24 of a scrap line, which conveys the sheared ends of the rolled stock 11 to a scrap assembly 25.

The discharge channel 23 for the main body in this case cooperates at its downstream end with an outlet drawing means 26 of a coil-forming headstock 27, which in turn discharges formed coils 28 onto a discharge conveyor 29.

According to a variant, which is not shown here, a winding machine, which is normally used instead of the coil-forming headstock 27 so as to produce very compact coils, is included downstream of the discharge channel 23.

The guide segment of the scrap channel 22 corresponding to the rolls of the outlet drawing means 26 of the coil-forming headstock 27 is advantageously movable or removable so as to enable any worn or damaged rolls to be quickly replaced, thus obviating lengthy machine downtimes.

The two-channel switch 20 in this case possesses the feature of having, at its intake section, the scrap channel 22 and discharge channel 23 positioned side by side and superimposed on each other, and of having, at its outlet section, the two channels 22, 23 substantially side by side and substantially on the plane of orientation of the one-channel 16 and two-channel 20 switches.

According to a variant the outlets of the scrap channel 22 and discharge channel 23 of the two-channel switch 20 are still on that plane of orientation but diverge slightly from each other so as to direct the respective products at a sharper angle towards their respective successive processing steps 25–27, as can be seen in FIGS. 1 and 2.

According to another variant the outlets of the two channels 22, 23 of the two-channel switch 20 lie in different planes (FIGS. 5 and 6a).

With such a lay-out the entry into the correct channel, whether it be the scrap channel 22 or discharge channel 23, by a sheared end segment 11a–11b or by the main body 111 of the rolled stock 11 respectively is achieved by pre-arranging a pair of blades, a blade 13a for the leading end and a blade 13b for the trailing end of the rolled stock 11, on each of the pair of the blade-holder drums 30.

In the initial step of entry of the arriving rolled stock 11 the one-channel switch 16 substantially faces the scrap channel 22 of the two-channel switch 20.

When the leading end of the rolled stock 11 has to be sheared, the one-channel switch 16 and the two-channel switch 20 are oriented laterally and are positioned substantially on the same axis as the axis of the rolled stock 11 being fed, and this axis coincides with the shearing axis at the moment of the shearing.

When the two switches 16, 20 are in this position, the blades 13 are in the best position for carrying out the shearing.

Figure 4A:
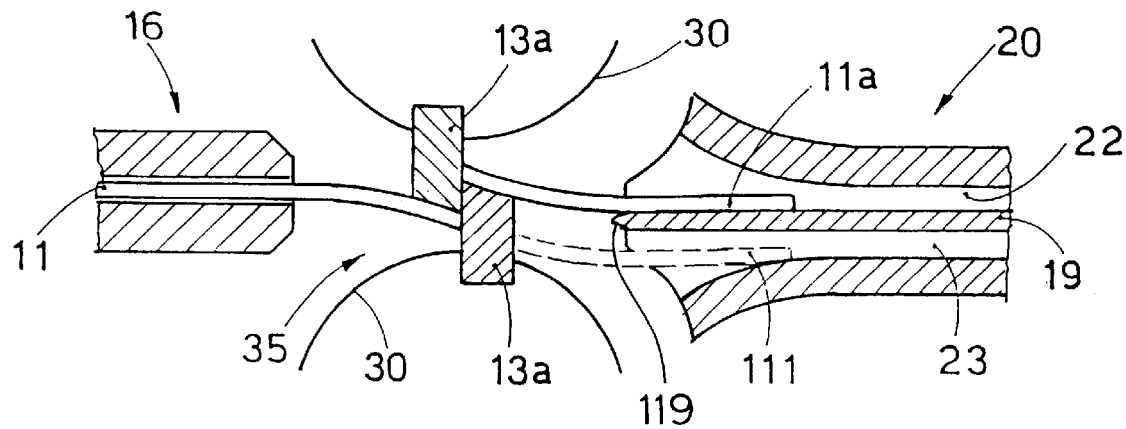
FIGS. 4a and 4b show a detail of the shearing area in the steps of shearing the leading end and trailing end respectively.
Figure 3:
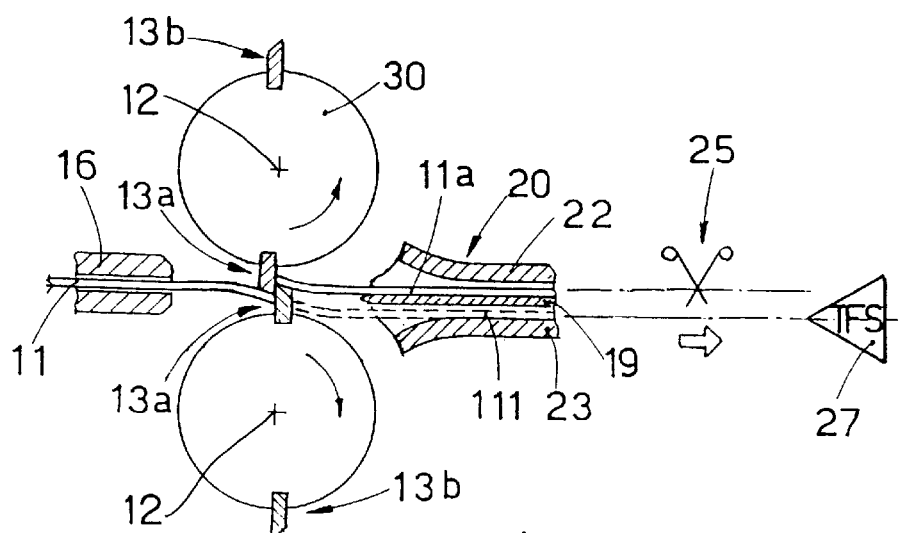
FIG. 3 is a diagram of the principle of the step of shearing the leading end.

As can be seen from the diagram showing the principle of the invention in FIGS. 3 and 4a, which refer to the shearing of the leading end segment 11a of the rolled stock 11, the relative positions on the opposed drums 30 of the pair of blades 13 to shear the leading end, and the relative movement as between the rolled stock 11 being fed and the contrarotating blades 13 determine a first arcuate portion consisting of the lowering of the sheared front lip of the leading end of the main body 111 of the rolled stock 11 and enable that lip to be introduced into the discharge channel 23.

The sheared leading end segment 11a is guided into the scrap channel 22; the lifting of the rear lip of the sheared leading end segment 11a is advantageous in preventing that end segment 11a catching against a central partition 19 between the channels 22, 23.

Figure 4B:
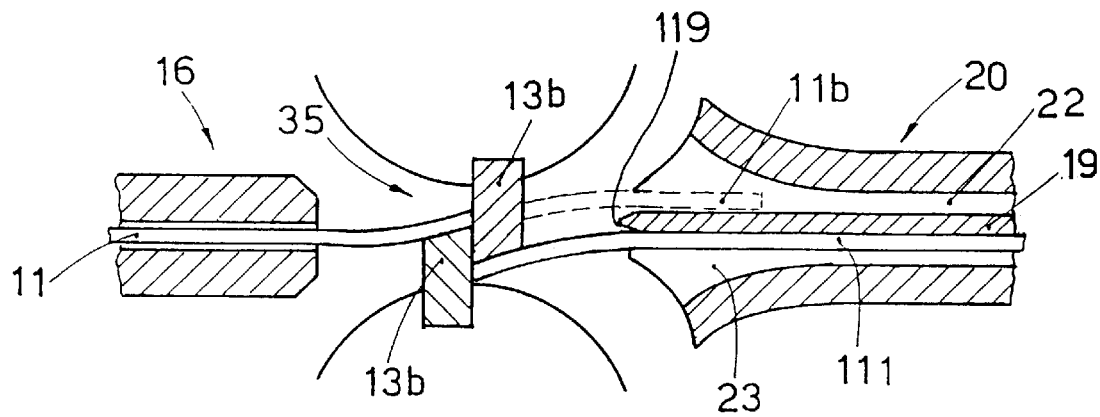

The central partition 19 dividing the two channels 22, 23 of the two-channel switch 20 possesses advantageously at the inlet of the two-channel switch 20 a lead-in bevel 119 which protrudes upstream to assist introduction of the products leaving the shearing area 35 into their respective channels 22, 23, as can be most clearly seen in FIGS. 4a and 4b.

The central partition 19 lies substantially on the plane of arrival and orientation of the rolled stock 11 in cooperation with the one-channel switch 16.

In the step of shearing the trailing end segment 11b of the rolled stock 11 (FIG. 4b) the one-channel switch 16 and the two-channel switch 20, after having oscillated between the two most lateral positions determined by the stationary terminal stops 18, are re-positioned substantially on the same axis as the shearing axis 15.

In this step the relative positions on the opposed drums 30 of the pair of blades 13b that shear the trailing end of the rolled stock 11 and the relative movement as between the rolled stock 11 being fed and the contrarotating blades 13 determine a second contrary arcuate portion consisting of the raising of the sheared lip of the front end of the sheared trailing end segment 11b and assist introduction of that lip into the scrap channel 22.

The sheared trailing end segment 11b can thus enter the scrap channel 22, while the main body 111 of the rolled stock 11 continues to be guided within the discharge channel 23.

The diagram of FIG. 8 shows the principle of working of the flying shears 10 according to the invention.

The leading end of the rolled stock 11 arriving actuates the step of control of the shearing of the leading end by means of detection by a sensor/photoelectric cell 37 located at the outlet of the rolling mill stand 38.

A sensor/photoelectric cell 39 is positioned upstream of the rolling mill stand 38 to control the shearing of the trailing end of the rolled stock 11.

The setting of the difference in time between the shearing of the leading end and of the trailing end can be carried out by means of a selector on a control panel (not shown).

The software actuation and control unit 36 controls the normal displacement speed of the switches 16, 20 and the reciprocal positions of the blades 13 and switches 16, 20.

The control of the synchronisation of the speed with the reciprocal positions of the switches 16, 20 and blades 13 is carried out in this case by transmission of a suitable signal to converters 40 pre-arranged respectively for the movement of the one-channel switch 16 and two-channel switch 20 by the drive motors 21 which govern these switches 16, 20. These motors 21 are connected to respective tachymetric dynamos 41 and to respective transducers 42 which transmit the angular position so as to identify the positions of the switches 16, 20 in relation to the axis of the blades 13.

The software actuation and control unit 36 performs also the control and display of the quantity and type of the synchronisation error as between the lateral positions of the switches 16, 20 and the circumferential positions of the blades 13. This control is carried out by notification of the positions of the blades 13 by means of an angular position transducer 43.

The system also includes sensors 44 to determine the starting point of the switches 16, 20 in the cycle of shearing the leading end of the rolled stock 11 and sensors 45 to determine the starting point of the switches 16, 20 in the cycle of shearing the trailing end.

The motor 31 which actuates the blades 13 and which is associated with a tachymetric dynamo 46 is connected advantageously to a bidirectional converter (not shown).

In this case (FIG. 3) the blades 13a which shear the leading end and the blades 13b which shear the trailing end are arranged along the circumference of their respective blade-holder drums 30 at about 180° from each other.

According to the invention (FIG. 7) the blades 13a–13b are spaced apart on their respective drums 30 by the same angle "α", "α" being the angle defined between the respective shearing surfaces of the blades 13 in the direction of rotation of the respective drums 30.

I claim:

1. Flying shears for shearing rolled stock having a leading end segment, a main body and a trailing end segment, the rolling stock travelling at high speed, comprising:

a pair of blade-holder drums, each bearing first and second blades, rotatable in opposite directions about spaced parallel axes of rotation and defining a shearing area therebetween;

a one-channel switch of a start stop type provided upstream of said shearing area, the one-channel switch conveying rolled stock lengthwise, wherein said one-channel switch is laterally movable on an orientation plane substantially containing an axis of feed of the rolled stock and parallel to and lying between said axes of rotation of said pair of blade-holder drums; and a two-channel switch provided downstream of said shearing area and having a first channel for receiving and directing the leading end segment and the trailing end segment of the rolled stock, and a second channel for receiving and directing the main body of the rolled stock, said first and second channels being superimposed, at least at their upstream ends, on a plane perpendicular to the axes of rotation of said blade-holder drums and separated by a central partition plate, wherein said two-channel switch is laterally movable substantially on the same orientation plane as, and in synchronization with, said one-channel switch;

wherein said first blades of each blade-holder drum are arranged on said pair of blade-holder drums so as to form a first pair of blades to shear the leading end of the rolled stock and to create at the downstream end of the main body of rolled stock a first arcuate portion to enable the main body of rolled stock to be introduced into said second channel of said two-channel switch; and wherein said second blades of each blade-holder drum are arranged on said pair of blade holder drums so as to form a second pair of blades to shear the trailing end of the rolled stock and to create in the downstream end of the trailing end segment a second arcuate portion to enable the trailing end segment to be introduced into said first channel of said two-channel switch.

2. Flying shears as in claim 1, in which outlets of the first and second channels of the two-channel switch are positioned substantially side by side on about their orientation plane.

3. Flying shears as in claim 1, in which outlets of the first and second channels of the two-channel switch are positioned substantially side by side but on different planes.

4. Flying shears as in claim 1, further comprising a pair of stationary stops for the guiding of the rolled stock, the pair of stationary stops defining outermost lateral orientation positions for the one-channel switch and the two-channel switch on the orientation plane.

5. Flying shears as in claim 1, further comprising a first motor for laterally displacing the one-channel switch and a second motor for laterally displacing the two-channel switch wherein the first and second motors are synchronized mechanically or electrically.

6. A combination, comprising the flying shears as in claim 1, a scrap assembly and a system for forming and collecting coils, wherein said first channel of said two-channel switch is a scrap channel and is connected downstream to the scrap assembly, and wherein said second channel of said two-channel switch is a discharge channel and is connected downstream to the system for forming and collecting coils.

7. A combination as in claim 6, wherein said system for forming and collecting coils is a coil-forming headstock.

8. A combination as in claim 6, wherein said system for forming and collecting coils is a winding unit.

* * * * *